Feb. 13, 1934.  J. A. SMITMANS  1,946,919

CUTTING MACHINE

Filed July 22, 1932

UNITED STATES PATENT OFFICE 1,946,919

CUTTING MACHINE

John A. Smitmans, Pittsburgh, Pa., assignor to United Engineering & Foundry Company, Pittsburgh, Pa., a corporation of Pennsylvania Application July 22, 1932. Serial No. 624,009

6 Claims. (Cl. 172—36)

My invention relates to cutting machines and particularly to the type known as rotary saws.

While machines of my invention may be used for cutting cold material, they are particularly adapted for high-speed friction cutting operations for rapidly cutting hot bars, rods or shapes of metal. The machine embodies a high-speed cutting disc for its cutting operations, "disc" being used herein in a broad sense to denote both plain-edge discs and discs having peripheral teeth.

In the operation of machines of this general character variations in the cross-sectional area of the material being operated upon, together with the advancing or withdrawing of the cutting tool from the operation, causes the saw and its connected mechanism to be subject to considerable shocks. These shocks tend to change the alignment of the rotatable shaft and its connected parts for operating the cutting disc. In case an alternating current electric motor such as a synchronous motor of usual construction is employed to drive the cutting disc, these shocks and irregularities of operation cause the rotor to materially change its alignment relative to that of the stator, and the air gap between the rotor and the stator of the motor must be sufficiently wide to permit these variations.

It is well known that in the operation of alternating current electric motors the efficiency of the motor decreases with the length of the air gap, and it is, therefore, desirable to employ an air gap of the smallest possible dimensions. Such small air gaps are not possible, however, with electric motors as ordinarily constructed for operation of hot saws and similar machine tools because of the shocks and variations in alignment.

In accordance with the present invention I provide an improved manner of mounting the stator and the rotor of an alternating current electric motor whereby these parts tend to remain in axial alignment regardless of irregularities in operation caused by varying conditions and shocks. In general, the arrangement consists in providing separate bearings for supporting the shaft of the rotor and for mounting the stator upon the rotor shaft. The stator is floatingly supported on the rotor shaft and is thereby adapted to freely adjust itself to variations in axial alignment of the rotor during its operation.

Figure 1:
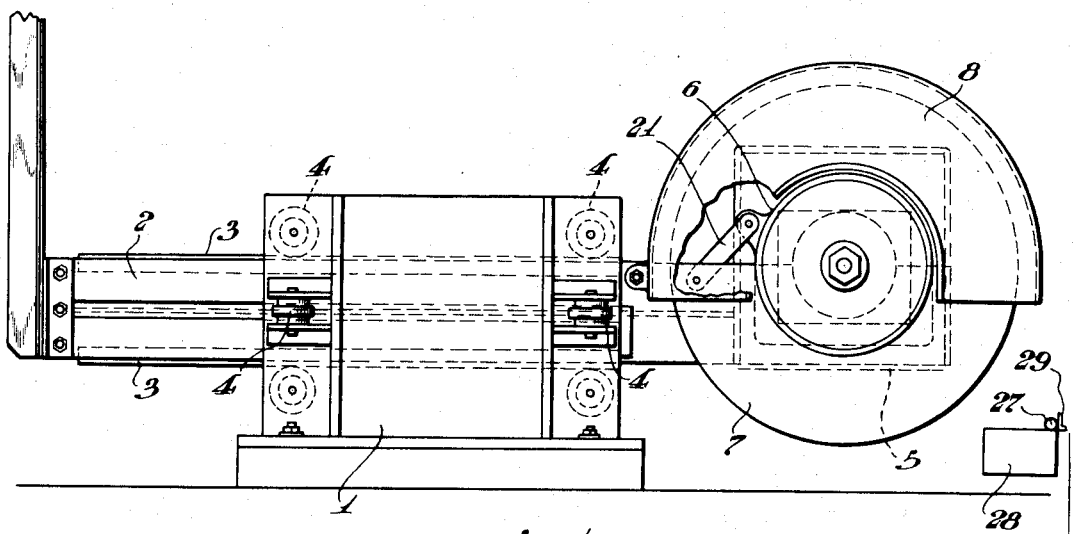
Figure 2:
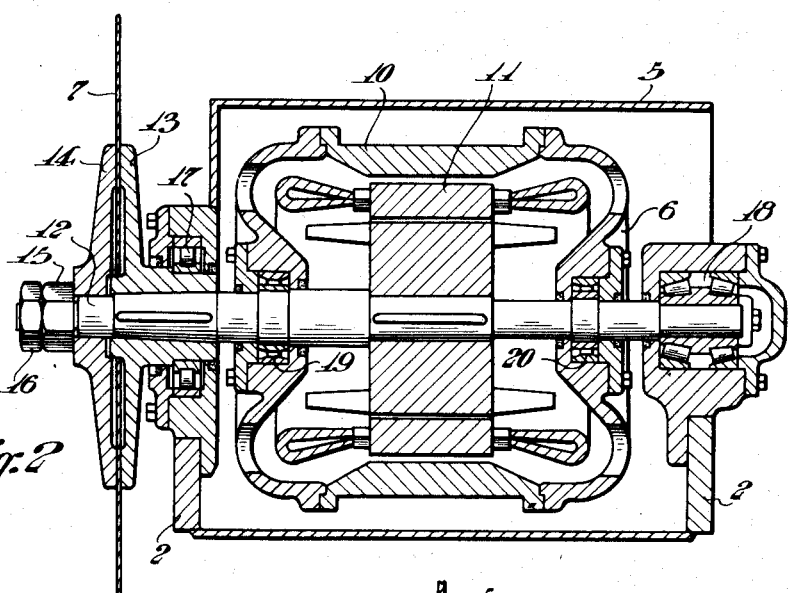

The details of my invention will be described in connection with the accompanying drawing, in which, Fig. 1 is an elevational view of a cutting machine constructed in accordance with my invention, parts being broken away; Fig. 2 a horizontal sectional view of the electric motor and certain of its associated parts; and Fig. 3 a view similar to Fig. 2 of a portion of the electric motor illustrating a modified method of mounting the cutting disc, parts being broken away.

Referring to the drawing, a friction cutting machine constructed in accordance with my invention comprises a stationary supporting framework 1 for supporting thereon a reciprocating carriage 2 having guide members 3 for cooperating with rollers 4 on the framework. The carriage 2 supports at its forward end an electric motor 6 for driving a cutting disc 7 which has a semi-circular guard 8. The electric motor is substantially enclosed by a shield 5 connected to carriage 2, the end of the shield adjacent the cutting disc being closed to prevent foreign particles from being thrown into the motor by the disc, and the upper portion of the opposite end of the shield being open to permit ventilation of the motor.

Referring particularly to Fig. 2, the electric motor 6, which is preferably of alternating current type, comprises a stator 10 and a rotor 11, the latter being provided with a shaft or arbor 12 upon which is mounted the cutting disc 7 by means of a flanged collar 13 and a clamping collar 14 that is secured in position by a nut 15 and a lock-nut 16.

The forward end of the rotor shaft 12 is supported by a bearing 17 which surrounds the axial portion of the collar 13 and is of suitable rugged type for withstanding heavy shocks. The other end of the shaft 12 is supported by a bearing 18 of suitable roller type or other heavy duty type. The bearings 17 and 18 are mounted upon the carriage 2. The stator 10 is floatingly supported upon the rotor shaft 12 by means of the usual motor bearings 19 and 20 which may be of the usual ball or roller type.

Inasmuch as the bearings 17 and 18 must withstand the shocks and irregularities of operation they are adapted for heavy duty while the usual motor bearings are required to withstand substantially only the weight of the stator. The bearings 17 and 18 may therefore be termed the main bearings and the bearings 19 and 20 the auxiliary bearings of the cutting machine.

The stator 10 is prevented from rotation by means of a somewhat flexible connection 21 between the stator 10 and the carriage 2. This connection 21 need not be rigid for the reason that the motor operates in one direction only and the connection is therefore always under tension during operation of the motor. The flexibility of the connection permits the stator to freely adjust itself to changes in axial position or alignment of the rotor and therefore enables the stator to be floatingly supported while prevented from rotation.

Figure 3:
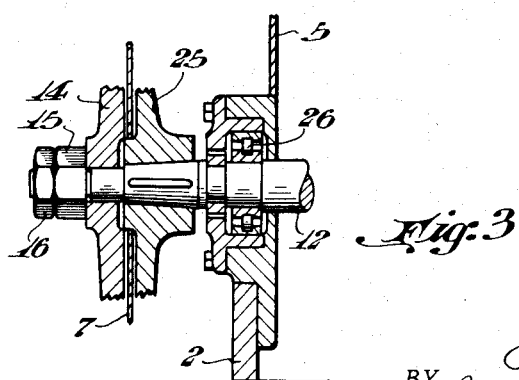

In the modified arrangement of Fig. 3 the relations of the various parts are substantially identical with those illustrated in Fig. 2 except that a flanged collar 25, against which the cutting disc 7 is clamped, is entirely without the forward main bearing 26. This arrangement is similar in principle to that of Fig. 2 but affords greater convenience in assembling or removing from the shaft the cutting disc and the parts for clamping it in position.

In the operation of my improved cutting machine the carriage 2 and the connected parts will be advanced by any suitable means upon the framework 1 to bring the cutting disc into engagement with the material to be cut by it. For example, the material may be a rod 27 that is supported by a suitable table 28 and held in position by a stop 29.

When the rapidly moving disc engages the material there will be a tendency of the shaft to change its alignment and, unless special means were provided, the air gap of the electric motor would be correspondingly varied. However any change in the axial alignment of the rotor causes a similar and equal change in the alignment of the stator because the latter is adapted to freely adjust itself to conform with the alignment of the rotor. Also the flexible connection 21 permits the stator to move axially in case of longitudinal movement of the rotor shaft.

The mounting of the respective parts of an alternating current electric motor in accordance with my invention enables the employment of a relatively small air gap, because the alignment of the rotor and the stator is never seriously disturbed. This arrangement accordingly increases the efficiency of operation and requires less power than in the case of an electric motor in which relatively wide air gaps are necessary because of the variations in relative alignment of the relatively movable parts.

The foregoing advantages will be apparent to those skilled in the art relating to friction cutting machines.

I claim:

1. A power-driven device comprising an electric motor having a stator and a rotor provided with a shaft extending through said stator, means comprising bearings for rotatably supporting said shaft, bearings for supporting said stator upon the rotor shaft, means for rigidly preventing rotation of said stator while freely permitting transverse movement thereof, and a driven element rigidly secured to said rotor shaft.

2. A power-driven device comprising an electric motor having a rotor with a shaft supported for rotation and having also a stator surrounding and rotatably supported on the rotor shaft and freely transversely movable to adjust its axial alignment to that of said rotor shaft without rotation therewith, and a driven element directly connected to said rotor shaft.

3. A power-driven device comprising an electric motor having a rotor with a shaft, bearings for the rotor shaft, said motor having a stator supported upon said rotor shaft by bearings surrounding said shaft and independent of the first-named bearings whereby said stator may maintain its axial alignment with said rotor and thereby maintain a substantially uniform air gap therebetween, means for preventing rotation of said stator but permitting limited transverse movement and a driven element directly connected to said rotor shaft.

4. A power-driven device comprising a sliding frame, an electric motor having a rotor with a shaft rotatably supported by said frame and having a stator rotatably supported by the rotor shaft whereby said rotor and said stator may maintain their axial alignment substantially independently of movements of said rotor relative to said frame, means for securing said stator to said frame for preventing rotation of said stator but permitting limited transverse movement, and a driven element carried by said rotor shaft.

5. A power-driven device comprising a frame, an electric motor having a rotor with a shaft supported by bearings mounted on said frame and having a stator floatingly supported by bearings upon the rotor shaft whereby it may adjust its position to maintain axial alignment with said rotor and a substantially constant air gap therebetween, means for preventing rotation of said stator while permitting limited transverse movement, and a driven element carried by said rotor shaft.

6. A power-driven device comprising a frame, an electric motor having a stator and a rotor with a shaft, main bearings for rotatably supporting the rotor shaft upon said frame, auxiliary bearings between the main bearings for floatingly supporting said stator upon said rotor shaft whereby said stator may adjust its axial alignment to conform with that of said rotor, means for flexibly anchoring said stator to said frame against rotation but permitting movements of the latter in accordance with the position of said rotor, and a driven element carried by said rotor.

JOHN A. SMITMANS.